(12) United States Patent
Haye

(10) Patent No.: US 11,939,875 B2
(45) Date of Patent: *Mar. 26, 2024

(54) GAS TURBINE ENGINE DRIVE SYSTEM HEALTH MONITOR

(71) Applicant: RTX Corporation, Farmington, CT (US)

(72) Inventor: Sheridon Everette Haye, Mansfield, CT (US)

(73) Assignee: RTX CORPORATION, Farmington, CT (US)

(*) Notice: Subject to any disclaimer, the term of this patent is extended or adjusted under 35 U.S.C. 154(b) by 0 days.

This patent is subject to a terminal disclaimer.

(21) Appl. No.: 17/702,099

(22) Filed: Mar. 23, 2022

(65) Prior Publication Data

US 2022/0213804 A1    Jul. 7, 2022

Related U.S. Application Data

(63) Continuation of application No. 16/812,644, filed on Mar. 9, 2020, now Pat. No. 11,293,301, which is a (Continued)

(51) Int. Cl.
*G01M 15/14* (2006.01)
*F01D 5/06* (2006.01)
(Continued)

(52) U.S. Cl.
CPC .............. *F01D 21/003* (2013.01); *F01D 5/06* (2013.01); *F02C 7/00* (2013.01); *F02C 7/36* (2013.01); *F02K 3/06* (2013.01); *G01H 1/003* (2013.01); *G01H 1/10* (2013.01); *G01M 15/14* (2013.01); *F02C 3/04* (2013.01); *F05D 2220/32* (2013.01);
(Continued)

(58) Field of Classification Search
CPC .......... F02C 3/04; F02C 7/00; F05D 2220/32; G01M 15/14

See application file for complete search history.

(56) References Cited

U.S. PATENT DOCUMENTS

| 4,426,641 A | 1/1984 | Kurihara et al. |
| 4,712,372 A | 12/1987 | Dickey et al. |

(Continued)

FOREIGN PATENT DOCUMENTS

| EP | 2980545 A1 | 2/2016 |
| EP | 3287629 A1 | 2/2018 |

OTHER PUBLICATIONS

EP Application No. 18201612.1 Extended EP Search Report dated Feb. 4, 2019, 9 pages.

*Primary Examiner* — Eric S. McCall
(74) *Attorney, Agent, or Firm* — CANTOR COLBURN LLP

(57) ABSTRACT

A drive system of a gas turbine engine includes a first drive shaft and a second drive shaft operable to rotate within the gas turbine engine, a first sensor operable to detect rotation of the first drive shaft, a second sensor operable to detect rotation of the second drive shaft, and a processing system coupled to the first sensor and the second sensor. The processing system is operable to determine a timing variation based on output of the first sensor and output of the second sensor, determine a torsional deflection between the first drive shaft and the second drive shaft based on the timing variation, and detect a health status of the drive system based on the torsional deflection.

17 Claims, 6 Drawing Sheets

Related U.S. Application Data continuation of application No. 15/788,020, filed on Oct. 19, 2017, now Pat. No. 10,590,796.

(51) Int. Cl.
- *F01D 21/00* (2006.01)
- *F02C 7/00* (2006.01)
- *F02C 7/36* (2006.01)
- *F02K 3/06* (2006.01)
- *G01H 1/00* (2006.01)
- *G01H 1/10* (2006.01)
- *F02C 3/04* (2006.01)

(52) U.S. Cl.
CPC .. *F05D 2240/60* (2013.01); *F05D 2260/4031* (2013.01); *F05D 2260/80* (2013.01); *F05D 2270/304* (2013.01)

(56) References Cited

U.S. PATENT DOCUMENTS

| | | |
|---|---|---|
| 5,031,459 A | 7/1991 | Twerdochlib |
| 5,033,305 A | 7/1991 | Rozelle et al. |
| 5,067,355 A | 11/1991 | Witte |
| 5,365,787 A | 11/1994 | Hernandez et al. |
| 5,501,105 A | 3/1996 | Hernandez et al. |
| 5,511,422 A | 4/1996 | Hernandez |
| 7,117,744 B2 | 10/2006 | Hobelsberger et al. |
| 10,590,796 B2 | 3/2020 | Haye |
| 2005/0216145 A1 | 9/2005 | Bellinger et al. |
| 2009/0177433 A1 | 7/2009 | Palmer et al. |
| 2009/0177434 A1 | 7/2009 | Kulczyk et al. |
| 2016/0010494 A1 | 1/2016 | Erlund et al. |
| 2017/0191374 A1 | 7/2017 | Boettner et al. |
| 2017/0267364 A1 | 9/2017 | Fraenzel |
| 2017/0299469 A1 | 10/2017 | Hagshenas et al. |
| 2018/0003073 A1 | 1/2018 | Rowe et al. |
| 2019/0120078 A1 | 4/2019 | Haye |
| 2020/0208535 A1 | 7/2020 | Haye |

GAS TURBINE ENGINE DRIVE SYSTEM HEALTH MONITOR

CROSS-REFERENCE TO RELATED APPLICATIONS

This application is a continuation of U.S. patent application Ser. No. 16/812,644, filed Mar. 9, 2020, which claims the benefit of U.S. patent application Ser. No. 15/788,020 filed Oct. 19, 2017, and issued as U.S. Pat. No. 10,590,796, issued Mar. 17, 2020, the disclosures of which are incorporated by reference herein in their entirety.

BACKGROUND

The subject matter disclosed herein generally relates to measurement systems and, more particularly, to a method and an apparatus for drive system health monitoring of a gas turbine engine.

Gas turbine engines typically include a compressor, a combustor, and a turbine, with an annular flow path extending axially through each. Initially, air flows through the compressor where it is compressed or pressurized. The combustor then mixes and ignites the compressed air with fuel, generating hot combustion gases. These hot combustion gases are then directed from the combustor to the turbine where power is extracted from the hot gases by causing blades of the turbine to rotate. The rotation also drives rotation of a fan that provides thrust under various operating conditions.

Multiple drive shafts may be used to link rotation of various stages of the turbine, compressor, and fan. Monitoring systems can be used to measure conditions within a gas turbine engine for monitoring degradation that may lead to a future servicing event, as well as identify maintenance conditions. Engine vibrations are typically monitored using accelerometers that can detect vibrations in one or more axis. However, accelerometers may not readily detect all desired conditions of rotating components that can be monitored for potential maintenance events.

BRIEF DESCRIPTION

According to one embodiment a drive system of a gas turbine engine includes a first drive shaft and a second drive shaft operable to rotate within the gas turbine engine, a first sensor operable to detect rotation of the first drive shaft, a second sensor operable to detect rotation of the second drive shaft, a drive gear system coupled to the first drive shaft and the second drive shaft, and a processing system coupled to the first sensor and the second sensor. The processing system is operable to determine a timing variation based on output of the first sensor and output of the second sensor, determine a torsional deflection between the first drive shaft and the second drive shaft based on the timing variation, and detect a health status of the drive system based on the torsional deflection. The health status identifies whether a fault condition of the drive gear system is detected based on the torsional deflection.

In addition to one or more of the features described above or below, or as an alternative, further embodiments may include where the processing system is operable to perform a frequency domain analysis based on output of the first sensor.

In addition to one or more of the features described above or below, or as an alternative, further embodiments may include where the processing system is operable to identify a dominant mode as a shaft frequency of the first drive shaft and a lower amplitude frequency domain component as a torsional mode of the first drive shaft.

In addition to one or more of the features described above or below, or as an alternative, further embodiments may include where the shaft frequency is used to identify an operating mode of the gas turbine engine, and trending of the torsional mode is determined based on the operating mode of the gas turbine engine.

In addition to one or more of the features described above or below, or as an alternative, further embodiments may include where the processing system is operable to perform a frequency domain analysis based on output of the second sensor and identify a dominant mode as a shaft frequency of the second drive shaft and a lower amplitude frequency domain component as a torsional mode of the second drive shaft.

In addition to one or more of the features described above or below, or as an alternative, further embodiments may include where the shaft frequency is used to identify an operating mode of the gas turbine engine, and trending of the torsional mode is determined based on the operating mode of the gas turbine engine.

In addition to one or more of the features described above or below, or as an alternative, further embodiments may include where the processing system is operable to track the timing variation between a first position indicator associated with the first drive shaft and a second position indicator associated with the second drive shaft.

According to another embodiment, a gas turbine engine includes a drive system including a first drive shaft operable to drive a fan of the gas turbine engine and a second drive shaft operable to be driven by a turbine of the gas turbine engine. The gas turbine engine also includes a first sensor operable to detect rotation of the first drive shaft, a second sensor operable to detect rotation of the second drive shaft, and a processing system coupled to the first and second sensors. The processing system is operable to identify an operating mode of the gas turbine engine, determine a trend of a torsional mode of the drive system based on the operating mode of the gas turbine engine, and detect a health status of the gas turbine engine based on the torsional mode.

In addition to one or more of the features described above or below, or as an alternative, further embodiments may include where the processing system is operable to perform a frequency domain analysis based on output of the first sensor and identify a dominant mode as a shaft frequency of the first drive shaft and a lower amplitude frequency domain component as a torsional mode of the first drive shaft.

In addition to one or more of the features described above or below, or as an alternative, further embodiments may include where the shaft frequency is used to identify the operating mode of the gas turbine engine.

In addition to one or more of the features described above or below, or as an alternative, further embodiments may include where the processing system is operable to perform a frequency domain analysis based on output of the second sensor and identify a dominant mode as a shaft frequency of the second drive shaft and a lower amplitude frequency domain component as a torsional mode of the second drive shaft.

In addition to one or more of the features described above or below, or as an alternative, further embodiments may include where the shaft frequency is used to identify the operating mode of the gas turbine engine.

In addition to one or more of the features described above or below, or as an alternative, further embodiments may include where a drive gear system is coupled between the first drive shaft and the second drive shaft, and the health status identifies whether a fault condition of the drive gear system is detected.

According to a further embodiment, a method of monitoring a drive system in a gas turbine engine is provided. The method includes detecting rotation of a first drive shaft via a first sensor operably coupled to a processing system, detecting rotation of a second drive shaft via a second sensor operably coupled to the processing system, identifying an operating mode of the gas turbine engine, and determining, by the processing system, a trend of a torsional mode of the drive system based on the operating mode of the gas turbine engine. The method also includes detecting a health status of the drive system based on the torsional mode.

In addition to one or more of the features described above or below, or as an alternative, further embodiments may include performing, by the processing system, a frequency domain analysis based on output of the first sensor.

In addition to one or more of the features described above or below, or as an alternative, further embodiments may include identifying a dominant mode as a shaft frequency and a lower amplitude frequency domain component as a torsional mode of the first drive shaft, where the shaft frequency is used to identify the operating mode of the gas turbine engine.

In addition to one or more of the features described above or below, or as an alternative, further embodiments may include performing a frequency domain analysis based on output of the second sensor and identify a dominant mode as a shaft frequency of the second drive shaft and a lower amplitude frequency domain component as a torsional mode of the second drive shaft.

In addition to one or more of the features described above or below, or as an alternative, further embodiments may include where a timing variation is tracked based on a first position indicator associated with the first drive shaft and a second position indicator associated with the second drive shaft.

In addition to one or more of the features described above or below, or as an alternative, further embodiments may include where a drive gear system is coupled between the first drive shaft and the second drive shaft, and the health status identifies whether a fault condition of the drive gear system is detected.

A technical effect of the apparatus, systems and methods is achieved by using one or more speed sensors to determine torsional modes of a drive system in a gas turbine engine as described herein.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
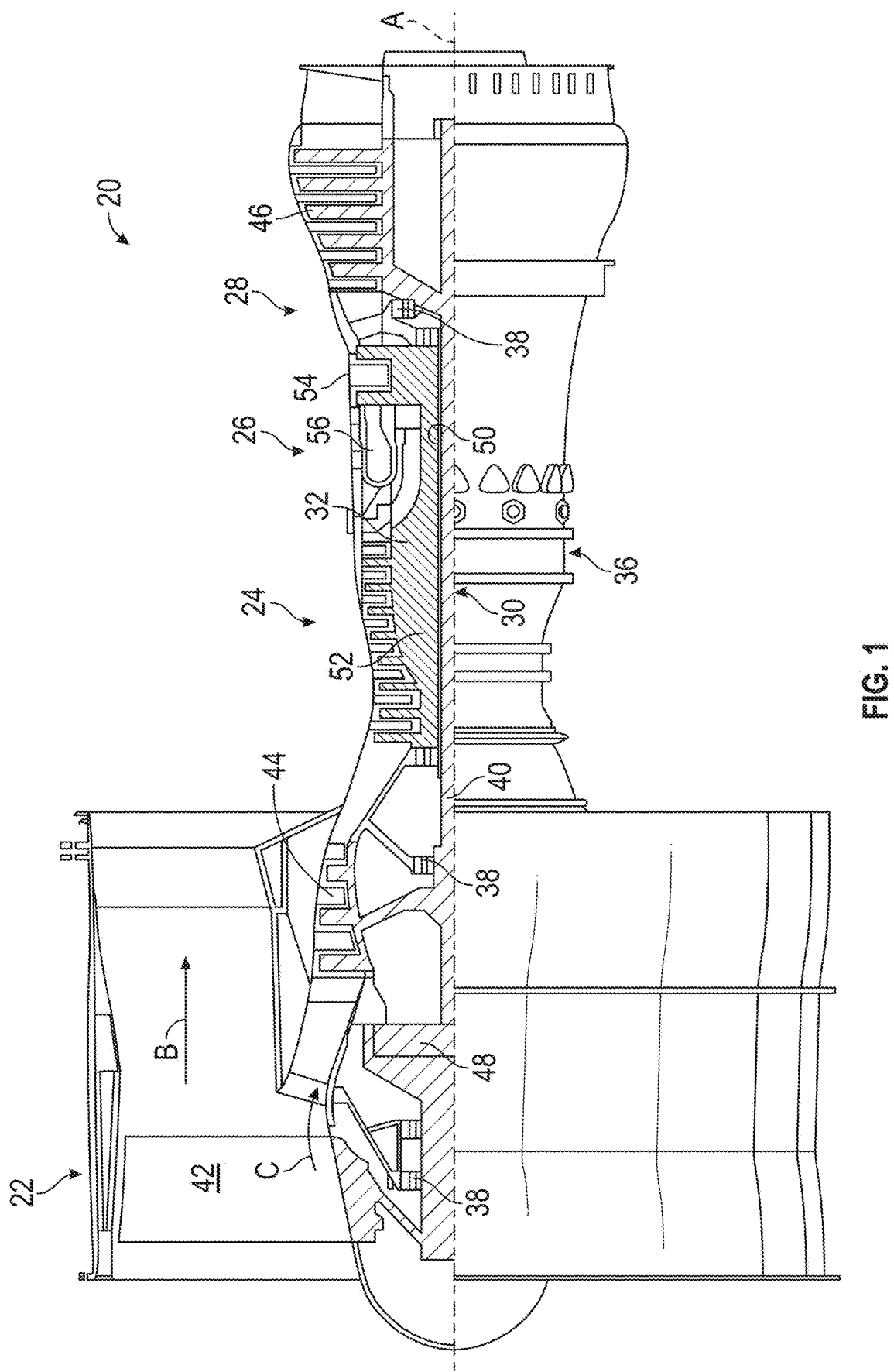
FIG. 1 is a partial cross-sectional illustration of a gas turbine engine, in accordance with an embodiment of the disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/(518.7° R)]^0.5. The "Low corrected fan tip speed" as disclosed herein according to one non-limiting embodiment is less than about 1150 ft/second (350.5 m/sec).

Figure 2:
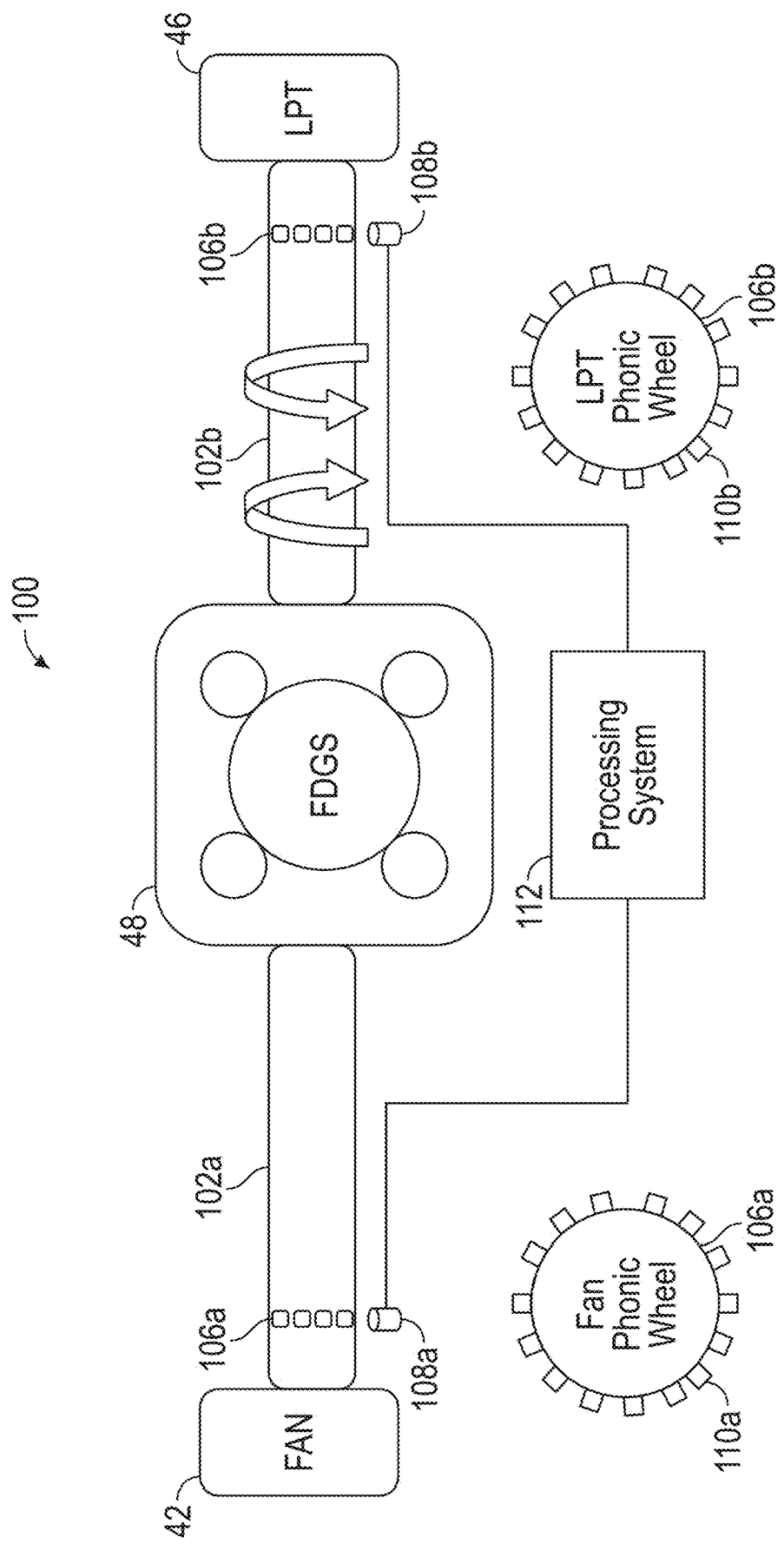
FIG. 2 is a schematic illustration of a drive system of a gas turbine engine, in accordance with an embodiment of the disclosure.

Referring now to FIG. 2, a drive system 100 of the gas turbine engine 20 of FIG. 1 is depicted. In the example of FIG. 2, the drive system 100 includes a first drive shaft 102a coupled between the fan 42 and the fan drive gear system 48 (also referred to as a drive gear system 48). The drive system 100 also includes a second drive shaft 102b coupled between the low pressure turbine 46 and the fan drive gear system 48 such that at least one drive shaft 102a, 102b is operable to rotate within the gas turbine engine 20. A first phonic wheel 106a is coupled to the first drive shaft 102a, and a second phonic wheel 106b is coupled to the second drive shaft 102b. A first speed sensor 108a is operable to detect rotation of the first phonic wheel 106a indicative of rotation of the first drive shaft 102a. Similarly, a second speed sensor 108b is operable to detect rotation of the second phonic wheel 106b indicative of rotation of the second drive shaft 102b. The first phonic wheel 106a may also be referred to as a fan phonic wheel, including a number of teeth 110a. Similarly, the second phonic wheel 106b may also be referred to as a low pressure turbine phonic wheel, including a number of teeth 110b. In some embodiments, the number of teeth 110a of the first phonic wheel 106a is the same as the number of teeth 110b of the second phonic wheel 106b. In other embodiments, the number of teeth 110a of the first phonic wheel 106a is different than the number of teeth 110b of the second phonic wheel 106b.

The teeth 110a of the first phonic wheel 106a may induce a detectable signal at the first speed sensor 108a as each tooth passes in close physical proximity to the first speed sensor 108a (e.g., through electro-magnetic communication). Similarly, teeth 110b of the second phonic wheel 106b may induce a detectable signal at the second speed sensor 108b as each tooth passes in close physical proximity to the second speed sensor 108b. The teeth 110a of the first phonic wheel 106a and the teeth 110b of the second phonic wheel 106b can be substantially regularly spaced. However, one of the teeth 110a of the first phonic wheel 106a and one of the teeth 110b of the second phonic wheel 106b can be physically offset or be physically extended to create a detectable position indicator for each of the first and second phonic wheel 106a, 106b, e.g., a once-per-revolution indicator.

In the example of FIG. 2, the first drive shaft 102a and the second drive shaft 102b are mechanically coupled through the fan drive gear system 48. Rotation of low pressure turbine 46 drives rotation of the second drive shaft 102b and drives rotation of the first drive shaft 102a through the fan drive gear system 48 to rotate the fan 42. A gear ratio of the fan drive gear system 48 can result in the first drive shaft 102a rotating at a slower speed than the second drive shaft 102b. Thus, a phonic wheel pulse train induced by rotation of the first phonic wheel 106a and detected by the first speed sensor 108a can transition slower than a phonic wheel pulse train induced by rotation of the second phonic wheel 106b and detected by the second speed sensor 108b as both the first and second drive shafts 102a, 102b rotate.

In embodiments, a processing system 112 is coupled to at least one of the first and second speed sensors 108a, 108b. In the example of FIG. 2, the processing system 112 is coupled to both the first and second speed sensors 108a, 108b. The processing system 112 is operable to detect one or more phonic wheel pulse trains, determine a torsional mode based on the one or more phonic wheel pulse trains, and record one or more trends of the torsional mode indicative of a health status of the drive system 100. The processing system 112 may use one or more signal processing techniques to determine torsional modes based on speed sensor signals from the first speed sensor 108a and/or the second speed sensor 108b.

Figure 3:
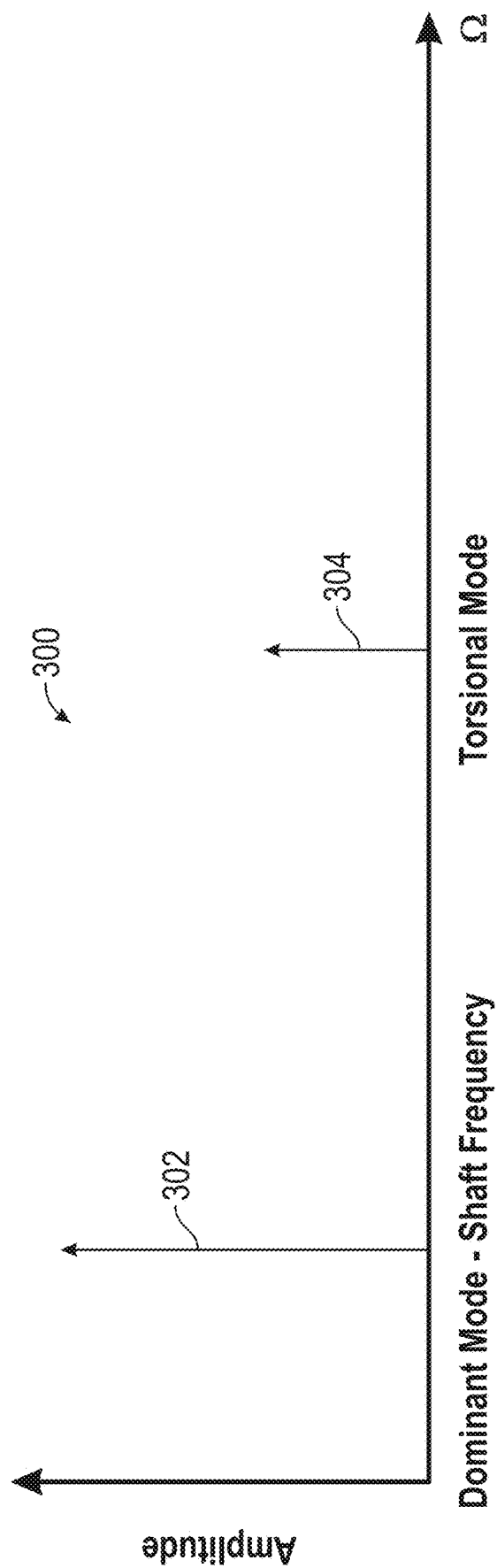
FIG. 3 is a frequency response plot of speed sensor data, in accordance with an embodiment of the disclosure.

As an example, the processing system 112 can perform individual shaft torsional analysis on a per shaft basis by separately analyzing data from each of the first speed sensor 108a and the second speed sensor 108b. The processing system 112 can perform a frequency domain analysis of a phonic wheel pulse train from the first speed sensor 108a or the second speed sensor 108b and identify a dominant mode 302 as a shaft frequency and a lower amplitude frequency domain component 304 as a torsional mode as depicted in the frequency response plot 300 of FIG. 3. The dominant mode 302 tracks with respect to rotational speed of the respective drive shaft (e.g., the first drive shaft 102a or the second drive shaft 102b) being monitored. The torsional mode has a lower amplitude than the dominant mode 302 and does not directly correlate to drive shaft rotational speed. The torsional mode represents a resonance due to oscillations in shaft loading. Frequency content in speed sensor signals, such as that depicted in frequency response plot 300, can be produced using a Fourier transform, a wavelet-based transform, or other known techniques. The same or similar frequency analysis can be performed with respect to the first drive shaft 102a and the second drive shaft 102b.

The shaft frequency can be used to identify an operating mode of the gas turbine engine 20, and trending of the torsional mode can be performed based on the operating mode of the gas turbine engine 20. For example, a speed range and transition sequence between speed ranges (as well as one or more other parameters) can be used to identify whether the gas turbine engine 20 is operating at ground idle, flight idle, max cruise, take-off, max power, or another known operating mode. The processing system 112 can collect a buffer of speed sensor values over a collection period for each of the first and second speed sensors 108a, 108b. The buffered speed sensor data can be analyzed to determine whether the collection period was substantially steady state and did not include an operating mode transition, for instance, the speed did not vary by more than a predetermined steady state threshold. If the collected speed data was determined to be steady state, the torsional mode can be determined, for instance, using a frequency domain transform as previously described. The torsional mode can be tracked with respect to the identified operating mode of the gas turbine engine 20. Trending of changes in the torsional mode can be performed on an operating mode basis to determine whether changes are indicative of increased shaft fatigue. For example, a rate of change of the torsional mode above a change threshold may be used to trigger an indicator, such as a health status. The health status can be set to initiate one or more actions, such as an inspection event, a maintenance event, additional monitoring events, and/or other events internal or external to the gas turbine engine 20. Further, unlike typical accelerometer based vibration monitoring systems, the torsional mode is not located at the shaft frequency where the dominant mode 302 is located and can be independent of the precise value of the shaft frequency.

Although the frequency response plot 300 is depicted with only two frequency components, it will be understood that additional frequency components (not depicted) may also be captured in the frequency response plot 300. For example, there may be spectral spreading and/or harmonics depending upon filtering and alignment between spectral bins of the frequency domain transform and the actual frequencies observed.

Figure 4:
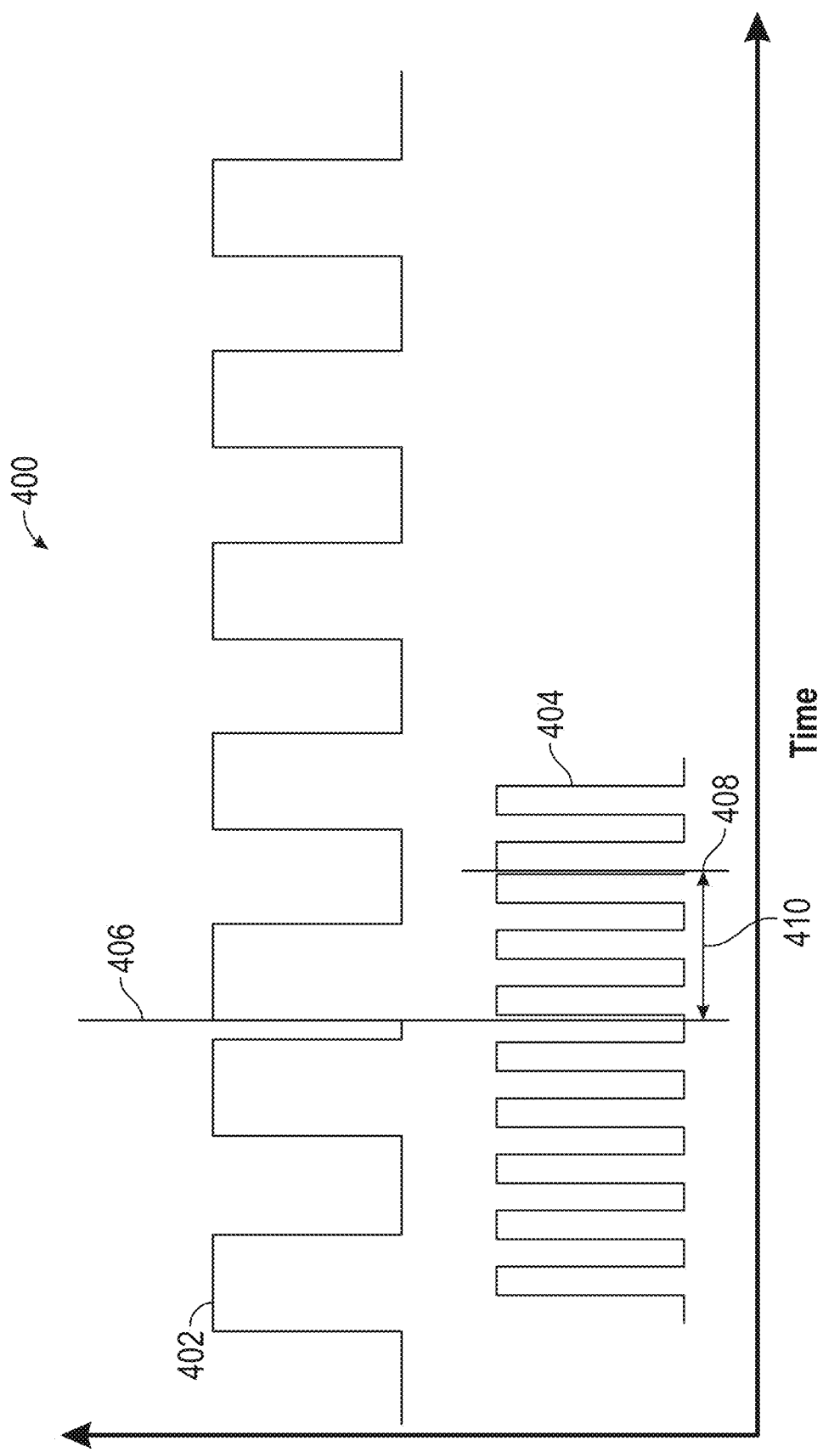
FIG. 4 is a timing diagram of phonic wheel pulse trains, in accordance with an embodiment of the disclosure.

As another example, the processing system 112 can observe a first phonic wheel pulse train 402 and a second phonic wheel pulse train 404 and track a timing variation between a first position indicator 406 of the first phonic wheel 106a and a second position indicator 408 of the second phonic wheel 106b as depicted in the timing diagram 400 of FIG. 4. In the example of FIG. 4, the first position indicator 406 is a rising edge of an offset tooth of the first phonic wheel 106a, and the second position indicator 408 is a rising edge of an offset tooth of the second phonic wheel 106b. A time difference 410 between the first and second position indicator 406, 408 can be tracked for variations indicative of torsional resonance through the fan drive gear system 48 of FIG. 2. The processing system 112 can determine a torsional deflection between the first drive shaft 102a with respect to the second drive shaft 102b based on the timing variation between the first position indicator 406 of the first phonic wheel 106a and the second position indicator 408 of the second phonic wheel 106b. As the gear ratio of the fan drive gear system 48 results in different rotational speeds of the first and second phonic wheel 106a, 106b, multiple revolutions of the first and second phonic wheel 106a, 106b can be tracked in groups to account for relative positional variations. For example, if the gear ratio of the fan drive gear system 48 results in a 2.3:1 speed reduction, then 10 revolutions of the first drive shaft 102a corresponds with 23 revolutions of the second drive shaft 102b, and the expected alignment positions can be compared to the observed alignment positions. However, the expected alignment positions need not be used, as the pattern of changes in the time difference 410 at a particular speed can be tracked to monitor torsional deflection. Similar to the frequency domain example of FIG. 3, the torsional deflection can be tracked with respect to the operating mode of the gas turbine engine 20, and the health status can be set to identify whether a fault condition of the drive gear system 48 is detected based on the torsional deflection.

Figure 5:
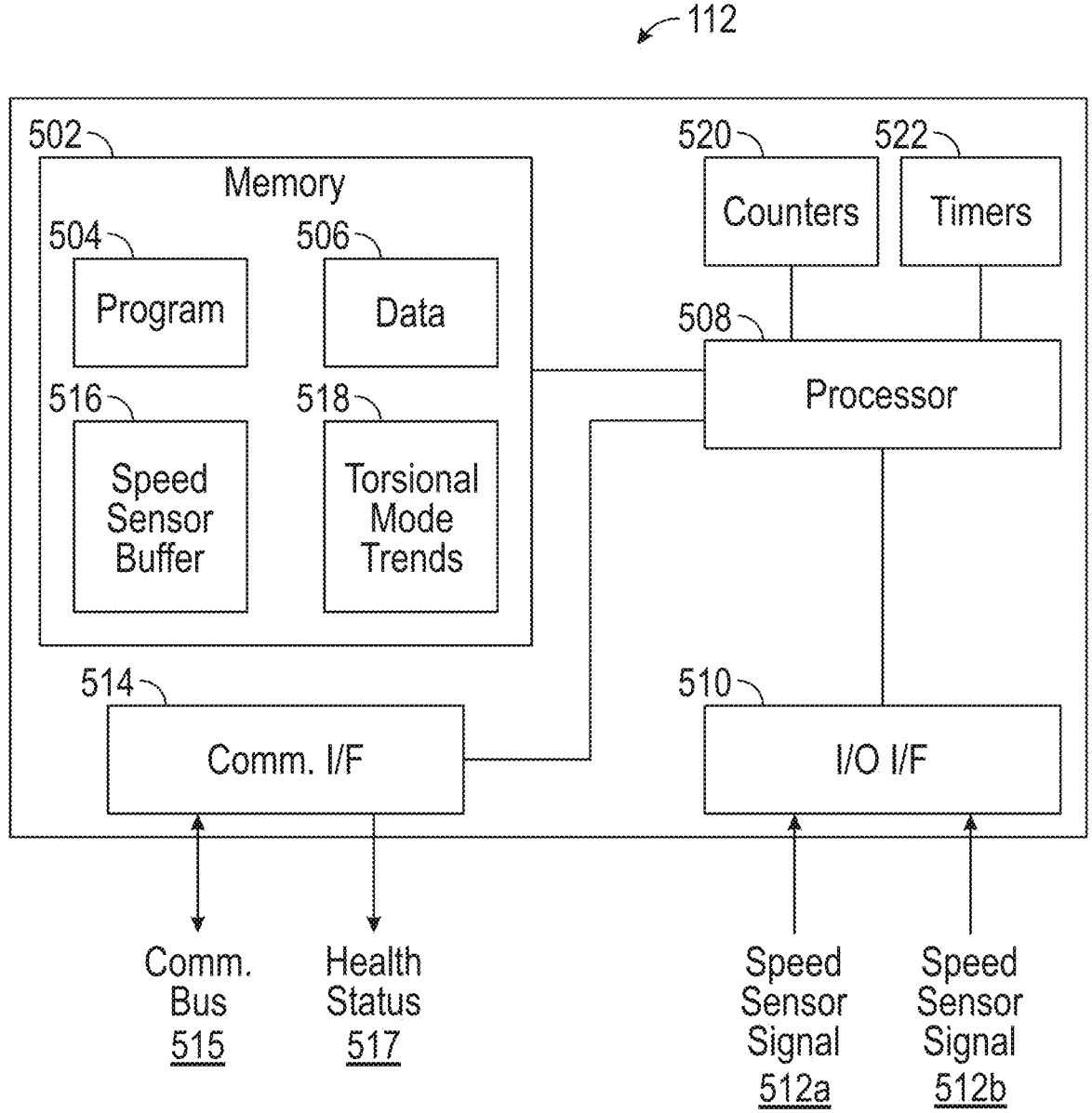
FIG. 5 is a block diagram of a processing system, in accordance with an embodiment of the disclosure.

Referring now to FIG. 5, an example of the processing system 112 is shown in greater detail. The processing system 112 includes a memory 502 which can store executable instructions and/or data associated with control and/or diagnostic/prognostic systems of the gas turbine engine 20 of FIG. 1. The executable instructions can be stored or organized in any manner and at any level of abstraction, such as in connection with one or more applications, processes, routines, procedures, methods, etc. As an example, at least a portion of the instructions are shown in FIG. 5 as being associated with a control program 504.

Further, as noted, the memory 502 may store data 506. The data 506 may include, but is not limited to, values to support detecting the operating mode of the gas turbine engine 20, commands for various actuators, lookup tables, sensor data, communication data, or any other type(s) of data as will be appreciated by those of skill in the art. One or more speed sensor buffer 516 and/or torsional mode trends 518 can be stored in the memory 502 and may be part of or separate from the data 506. The instructions stored in the memory 502 may be executed by one or more processors, such as a processor 508. The processor 508 may be operative on the data 506, speed sensor buffer 516, and/or torsional mode trends 518.

The processor 508 can be any type or combination of computer processors, such as a microprocessor, microcontroller, digital signal processor, application specific integrated circuit, programmable logic device, and/or field programmable gate array. The memory 502 is an example of a non-transitory computer readable storage medium tangibly embodied in or operably connected to the processing system 112 including executable instructions stored therein, for instance, as firmware.

The processor 508, as shown, is coupled to one or more input/output (I/O) devices through an I/O interface 510. For example, the I/O interface 510 can be operable to receive speed sensor signals 512a, 512b from the first and second speed sensors 108a, 108b of FIG. 2. The processor 508 can also communicate with one or more other systems (not depicted) using a communication interface 514 to send and receive messages on one or more communication buses 515, which may include transmitting a health status 517 based on torsional values captured in the torsional mode trends 518. The processing system 112 may further include other features or components as known in the art. For example, the processing system 112 may include one or more transceivers and/or devices configured to transmit and/or receive information or data from sources external to the processing system 112. For example, in some embodiments, the processing system 112 may be configured to receive information over a network (wired or wireless) or through a cable or wireless connection with one or more devices remote from the processing system 112 via the communication interface 514. The information received can stored in the memory 502 (e.g., as data 506) and/or may be processed and/or employed by one or more programs or applications (e.g., program 504) and/or the processor 508.

The processing system 112 can also include one or more counters 520 and/or timers 522. The counters 520 can be used, for example, to track the teeth 110a, 110b of the first and second phonic wheel 106a, 106b and assist in determining the location of the first and second position indicator 406, 408, for instance, based on tooth-to-tooth timing variations observed via timers 522. The timers 522 can also support observations of the time difference 410 between the first and second position indicator 406, 408.

Although the processing system 112 is depicted as a single system, it will be understood the portions of the processing system 112 can be distributed between multiple processing circuits, including multiple instances of the processor 508, memory 502, and the like.

Figure 6:
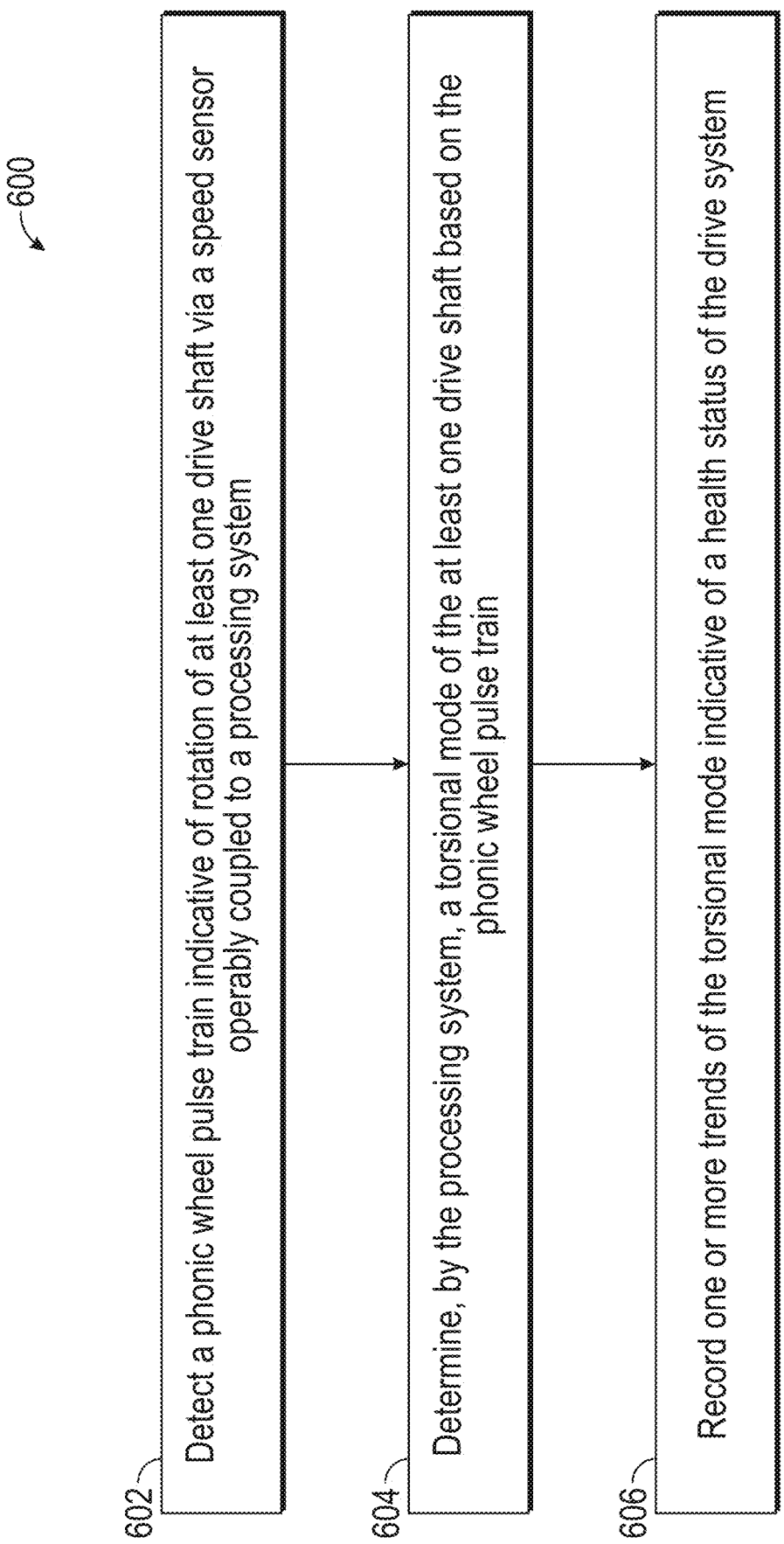
FIG. 6 is a flow chart illustrating a method, in accordance with an embodiment of the disclosure.

Referring now to FIG. 6 with continued reference to FIGS. 1-5. FIG. 6 is a flow chart illustrating a method 600 for health monitoring of the drive system 100 in a gas turbine engine 20, in accordance with an embodiment. At block 602, a phonic wheel pulse train indicative of rotation of at least one drive shaft is detected via a speed sensor operably coupled to processing system 112, such as the first phonic wheel pulse train 402 of the first drive shaft 102a detected by the first speed sensor 108a or the second phonic wheel pulse train 404 of the second drive shaft 102b detected by the second speed sensor 108b.

At block 604, the processing system 112 determines a torsional mode of the at least one drive shaft based on the phonic wheel pulse train. The processing system 112 may perform a frequency domain analysis of the one or more phonic wheel pulse trains as previously described in reference to FIG. 3. The frequency domain analysis can include identifying a dominant mode 302 as a shaft frequency and a lower amplitude frequency domain component 304 as the torsional mode. The shaft frequency can be used to identify an operating mode of the gas turbine engine 20. For example, the operating mode can be identified as one of: ground idle, flight idle, max cruise, take-off, max power, and any other flight condition known to one of skill in the art. In some embodiments, the processing system 112 can track a timing variation between a first position indicator 406 of the first phonic wheel 106a on the first drive shaft 102a and a second position indicator 408 of the second phonic wheel 106b on the second drive shaft 102b. A torsional deflection between the first drive shaft 102a with respect to the second drive shaft 102b can be determined based on the timing variation (e.g., changes in time difference 410) between the first position indicator 406 of the first phonic wheel 106a and the second position indicator 408 of the second phonic wheel 106b.

At block 606, one or more trends of the torsional mode indicative of a health status 517 of the drive system 100 are recorded, for instance, in torsional mode trends 518. As previously described, trending of the torsional mode can determined based on the operating mode of the gas turbine engine 20. The health status 517 identifies whether a fault condition of the drive gear system 48 can be detected based on the torsional deflection.

While the above description has described the flow process of FIG. 6 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A drive system of a gas turbine engine, the drive system comprising:
    a first drive shaft and a second drive shaft operable to rotate within the gas turbine engine;
    a first sensor operable to detect rotation of the first drive shaft;
    a second sensor operable to detect rotation of the second drive shaft;
    a drive gear system coupled to the first drive shaft and the second drive shaft; and
    a processing system coupled to the first sensor and the second sensor, the processing system operable to:
        determine a timing variation based on output of the first sensor and output of the second sensor;
        determine a torsional deflection between the first drive shaft and the second drive shaft based on the timing variation; and
        detect a health status of the drive system based on the torsional deflection, wherein the health status identifies whether a fault condition of the drive gear system is detected based on the torsional deflection.

2. The drive system of claim 1, wherein the processing system is operable to track the timing variation between a first position indicator associated with the first drive shaft and a second position indicator associated with the second drive shaft.

3. The drive system of claim 1, wherein the processing system is operable to perform a frequency domain analysis based on output of the second sensor and identify a dominant mode as a shaft frequency of the second drive shaft and a lower amplitude frequency domain component as a torsional mode of the second drive shaft.

4. The drive system of claim 3, wherein the shaft frequency is used to identify an operating mode of the gas turbine engine, and trending of the torsional mode is determined based on the operating mode of the gas turbine engine.

5. The drive system of claim 1, wherein the processing system is operable to perform a frequency domain analysis based on output of the first sensor.

6. The drive system of claim 5, wherein the processing system is operable to identify a dominant mode as a shaft frequency of the first drive shaft and a lower amplitude frequency domain component as a torsional mode of the first drive shaft.

7. The drive system of claim 6, wherein the shaft frequency is used to identify an operating mode of the gas turbine engine, and trending of the torsional mode is determined based on the operating mode of the gas turbine engine.

8. A gas turbine engine comprising:
a drive system comprising:
a first drive shaft operable to drive a fan of the gas turbine engine; and
a second drive shaft operable to be driven by a turbine of the gas turbine engine;
a first sensor operable to detect rotation of the first drive shaft;
a second sensor operable to detect rotation of the second drive shaft; and
a processing system coupled to the first and second sensors, the processing system operable to:
identify an operating mode of the gas turbine engine, wherein a shaft frequency is used to identify the operating mode of the gas turbine engine;
determine a trend of a torsional mode of the drive system based on the operating mode of the gas turbine engine; and
detect a health status of the gas turbine engine based on the torsional mode.

9. The gas turbine engine of claim 8, wherein the processing system is operable to perform a frequency domain analysis based on output of the first sensor and identify a dominant mode as the shaft frequency of the first drive shaft and a lower amplitude frequency domain component as a torsional mode of the first drive shaft.

10. The gas turbine engine of claim 8, wherein the processing system is operable to perform a frequency domain analysis based on output of the second sensor and identify a dominant mode as the shaft frequency of the second drive shaft and a lower amplitude frequency domain component as a torsional mode of the second drive shaft.

11. The gas turbine engine of claim 8, wherein a drive gear system is coupled between the first drive shaft and the second drive shaft, and the health status identifies whether a fault condition of the drive gear system is detected.

12. A method of monitoring a drive system in a gas turbine engine, the method comprising:
detecting rotation of a first drive shaft via a first sensor operably coupled to a processing system;
detecting rotation of a second drive shaft via a second sensor operably coupled to the processing system;
identifying an operating mode of the gas turbine engine, wherein a shaft frequency is used to identify the operating mode of the gas turbine engine;
determining, by the processing system, a trend of a torsional mode of the drive system based on the operating mode of the gas turbine engine; and
detecting a health status of the drive system based on the torsional mode.

13. The method of claim 12, further comprising:
performing a frequency domain analysis based on output of the second sensor and identify a dominant mode as the shaft frequency of the second drive shaft and a lower amplitude frequency domain component as a torsional mode of the second drive shaft.

14. The method of claim 12, wherein a timing variation is tracked based on a first position indicator associated with the first drive shaft and a second position indicator associated with the second drive shaft.

15. The method of claim 12, wherein a drive gear system is coupled between the first drive shaft and the second drive shaft, and the health status identifies whether a fault condition of the drive gear system is detected.

16. The method of claim 12, further comprising:
performing, by the processing system, a frequency domain analysis based on output of the first sensor.

17. The method of claim 16, further comprising:
identifying a dominant mode as the shaft frequency and a lower amplitude frequency domain component as a torsional mode of the first drive shaft, wherein the shaft frequency is used to identify the operating mode of the gas turbine engine.

* * * * *